(12) United States Patent
Impidjati et al.

(10) Patent No.: US 10,060,771 B2
(45) Date of Patent: Aug. 28, 2018

(54) FASTENING APPARATUS FOR AN ELECTRONIC DEVICE AND METHOD FOR FASTENING AN ELECTRONIC DEVICE

(71) Applicant: SICK AG, Waldkirch (DE)

(72) Inventors: Impidjati, Waldkirch (DE); Olaf Machul, Waldkirch (DE)

(73) Assignee: SICK AG, Waldkirch (DE)

( * ) Notice: Subject to any disclaimer, the term of this patent is extended or adjusted under 35 U.S.C. 154(b) by 419 days.

(21) Appl. No.: 14/817,460

(22) Filed: Aug. 4, 2015

(65) Prior Publication Data

US 2016/0047678 A1 Feb. 18, 2016

(30) Foreign Application Priority Data

Aug. 13, 2014 (EP) .................. 14180836

(51) Int. Cl.
- *B25G 3/18* (2006.01)
- *F16B 21/00* (2006.01)
- *F16D 1/00* (2006.01)
- *G01D 11/30* (2006.01)
- *G01D 11/24* (2006.01)

(52) U.S. Cl.
CPC ............. *G01D 11/30* (2013.01); *G01D 11/24* (2013.01); *Y10T 403/599* (2015.01)

(58) Field of Classification Search
CPC .......... G01D 11/24; G01D 11/30; F16D 1/12; F16D 3/20; Y10T 403/599; Y10T 403/60; Y10T 403/602; Y10T 403/604; Y10T 403/606; F16F 1/02; F16F 1/04
USPC .................. 403/325–37, 329; 267/166, 174
See application file for complete search history.

(56) References Cited

U.S. PATENT DOCUMENTS

| | | | | | |
|---|---|---|---|---|---|
| 4,671,697 | A | * | 6/1987 | Ando ................. | H02B 1/052 403/325 |
| 5,730,342 | A | * | 3/1998 | Tien ................... | A45F 5/02 224/197 |
| 5,769,613 | A | * | 6/1998 | Kim .................... | F04B 39/0072 181/229 |
| 5,850,954 | A | * | 12/1998 | Dong-Joo ........... | H04M 1/04 224/197 |

(Continued)

FOREIGN PATENT DOCUMENTS

| | | |
|---|---|---|
| DE | 100 49 111 A1 | 6/2001 |
| EP | 0677722 A2 | 10/1995 |

(Continued)

OTHER PUBLICATIONS

European Search Report dated May 2, 2015 corresponding to European application No. 14180836.0-1558.

*Primary Examiner* — Amber R Anderson
*Assistant Examiner* — Nahid Amiri
(74) *Attorney, Agent, or Firm* — Nath, Goldberg & Meyer; Jerald L. Meyer; Stanley N. Protigal

(57) ABSTRACT

A fastening apparatus for an electronic device (3) and a method for fastening a sensor housing (2) having a fastening flange (4) and having a fastening base (6), wherein the fastening flange (4) is configured to be positioned in a passage opening (8) in the fastening base (6) and wherein the fastening flange (4) is configured to be locked in the fastening base (6), a fixing slider (10) being displaceably arranged at the fastening base (6) to lock and/or to release the fastening flange (4) in the fastening base (6).

10 Claims, 9 Drawing Sheets

(56) References Cited

U.S. PATENT DOCUMENTS

Figure 1:
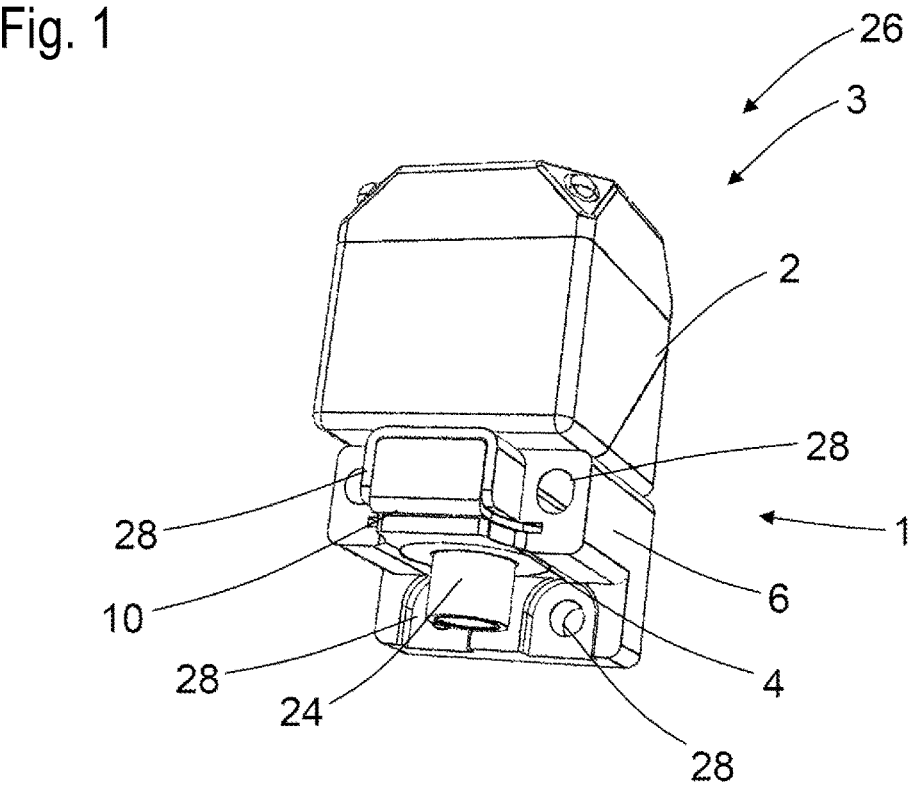

| | | | | |
|---|---|---|---|---|
| 5,924,174 A | * | 7/1999 | Mizuno | A44B 19/306 |
| | | | | 24/421 |
| 6,000,670 A | * | 12/1999 | Okamoto | E04H 9/021 |
| | | | | 248/562 |
| 6,283,348 B1 | * | 9/2001 | Wang | A45F 5/02 |
| | | | | 224/197 |
| 6,955,279 B1 | * | 10/2005 | Mudd | A45F 5/02 |
| | | | | 224/197 |
| 7,207,092 B2 | * | 4/2007 | Iwase | A44B 19/308 |
| | | | | 24/419 |
| 7,281,940 B1 | | 10/2007 | Chuang | |
| 7,510,345 B2 | * | 3/2009 | Kosh | A44B 11/2592 |
| | | | | 292/197 |
| 8,613,564 B2 | * | 12/2013 | Busch | F16B 21/09 |
| | | | | 24/3.11 |
| 2005/0174748 A1 | | 8/2005 | Kojima | |
| 2010/0031718 A1 | * | 2/2010 | Heil | B60R 25/04 |
| | | | | 70/454 |
| 2010/0071168 A1 | * | 3/2010 | Miller | A45F 5/02 |
| | | | | 24/3.11 |
| 2013/0241378 A1 | * | 9/2013 | Zhang | H05K 5/0221 |
| | | | | 312/223.2 |
| 2014/0029214 A1 | | 1/2014 | Lu | |

FOREIGN PATENT DOCUMENTS

| | | |
|---|---|---|
| EP | 1492977 A1 | 5/2005 |
| JP | 10-270869 A | 10/1998 |
| UA | 2 302 611 A | 1/1997 |

* cited by examiner

FASTENING APPARATUS FOR AN ELECTRONIC DEVICE AND METHOD FOR FASTENING AN ELECTRONIC DEVICE

The present invention relates to a fastening apparatus for an electronic device in accordance with the preamble of claim 1 and to a method for fastening an electronic device in accordance with the preamble of claim 9.

EP 1 492 977 A1 discloses a fastening base for holding an electrical device having a reception opening for receiving a connection stub of the electrical device and having a locking pivot lever for fixing the connection stub in the reception opening, wherein the locking pivot lever can be pivoted into a locking position and into an open position, wherein the locking pivot lever has a projecting wedge and wherein the wedge is formed for an at least partly shape-matched engagement with a cut-out provided in the connection stub with the locking pivot lever pivoted into the locking position.

In the prior art, the locking pivot lever can release itself from its locking position due to tremors and vibrations such that the sensor function is, for example, possibly no longer present in a complex automation system. The availability of such a system is thereby impaired. Furthermore, a loss of the sensor function can likewise also occur by human failure, for example, if the application of the locking lever is forgotten or with faulty handling, since the sensor possibly releases itself from the fastening base.

An object of the invention is to provide an improved fastening apparatus. The improved fastening apparatus should ensure a secure fastening with a vibration load/shock load. The fastening apparatus should furthermore avoid a faulty handling.

The object is satisfied in accordance with claim 1 by a fastening apparatus for an electronic device having a fastening flange and having a fastening base, wherein the fastening flange can be positioned in a passage opening in the fastening base and wherein the fastening flange can be locked in the fastening base, a fixing slider being displaceably arranged at the fastening base to lock and/or to release the fastening flange in the fastening base.

The object is furthermore satisfied by a method in accordance with claim 7 for fastening an electronic device having a fastening flange in a fastening base, wherein the fastening flange is positioned in the fastening base, wherein the fastening flange is locked in the fastening base and a fixing slider is provided, which is displaced at the fastening base, to lock and/or to release the fastening flange in the fastening base.

The electronic device is preferably a sensor or a sensor housing.

Since the fixing slider is displaceably arranged at the fastening base to lock the fastening flange in the fastening base, a secure fastening of the electronic device or of the sensor housing in the fastening base is ensured. With respect to a locking pivot lever in accordance with the prior art, a fixing slider offers a better fixing since a better securing with a vibration load and a shock load of the fastening apparatus is ensured by the displacement path on the displacement of the fixing slider. The displaced fixing slider can release itself less effectively with a vibration load or with a shock load than a locking pivot lever in accordance with the prior art.

In a preferred embodiment of the invention, the fixing slider has a first spring, wherein the fixing slider is positioned in the locking position by the spring.

The fixing slider is automatically positioned and fixed in the locking position by the first spring. The fixing slider must be actuated for the assembly of the fastening flange such that the first spring is, for example, pressed together. After the fastening flange has been positioned at the correct position for the assembly or installation, the fixing slider can be released and the first spring pushes the fixing slider back into the locking position or fully installed position without manual actuation, whereby a secure fastening is ensured and a faulty handling is avoided.

In a further development of the invention, the fixing slider has an actuation surface, wherein the fixing slider is brought into an assembly position for the fastening flange by displacement by the actuation surface, wherein the fastening flange can be introduced into a passage opening of the fastening base.

As already mentioned, the fixing slider is actuated for the assembly of the fastening flange such that the first spring is, for example, pressed together. In accordance with this embodiment, an actuation means or an actuation surface is optionally provided for the actuation of the fixing slider. The actuation surface is preferably formed for an actuation by a finger. This means the actuation surface approx. has an actuation surface of approx. 1 cm². The fixing slider can thereby be operated without tools. The actuation surface can also be formed as larger to ensure a more robust and more secure actuation. The actuation surface can, however, also be formed as smaller, for example, if the actuation surface should be able to be actuated using only one tool, for example, using a screwdriver or a similar tool.

In a preferred embodiment of the invention, the fixing slider is held in the assembly position by a locking slider. The fixing slider thereby does not need to be constantly actuated to adopt the assembly position. A single actuation of the fixing slider is rather sufficient such that the fixing slider is held fixed in the assembly position by the locking slider. The fastening flange can thereby be introduced into the fastening base without an additional actuation. After the fastening flange has been placed in the fastening base, the locking slider is released again and the fixing slider moves back into the locking position again by the first spring. The fixing slider is brought abruptly into the locking position by the spring force of the first spring, whereby an acoustic feedback signal is generated mechanically such that a latching of the fastening flange is so-to-say audible and an acoustic assembly check is generated in this manner.

In a further development of the invention, the locking slider is positioned and fixed by a second spring. As already mentioned, the fixing slider is held in the assembly position by a locking slider. In this position, the locking slider is held fixed and positioned by the second spring. Without an actuation, the locking slider always adopts a position to hold the fixing slider in an assembly position by the second spring.

In a further development of the invention, the locking slider can be displaced by the sensor housing on an introduction of the fastening flange into the fastening base, whereby a locking of the fixing slider by the locking slider is released, whereby the fixing slider is moved from an assembly or installation position into the locking position by the first spring. In accordance with this embodiment of the invention, the locking slider is displaced by the sensor housing itself into a position in which the fixing slider moves into the locking position by the first spring. A locking of the sensor housing is thereby carried out so-to-say automatically by the introduction of the sensor housing having the fastening flange without an additional actuation of the fixing slider or of another component having to take place.

In a further development of the invention, the fastening base can be ejected by the locking slider due to the second spring on a release of the fastening base by the fixing slider.

If the actuation means of the fixing slider is actuated again such that the fastening base adopts an assembly position again, the sensor is automatically ejected from the fastening base by the second spring and by the locking slider.

In a further development of the invention, blocking means are provided, whereby the fixing slider can be blocked in the locking position. The blocking means can be manually actuated. The blocking means can be a slider, a key, a latching means or similar. It is ensured by the manually actuated blocking means that the electronic device or the sensor housing is not released by an accidental actuation of the fixing slider or of the actuation means such that the actuation means would move into the assembly position such that the electronic device or the sensor housing would no longer be fixed or locked. With an actuated blocking means, the fixing slider or the actuation means cannot be actuated. The fixing slider and the actuation means can only be actuated after the blocking means has been released.

Figure 2:
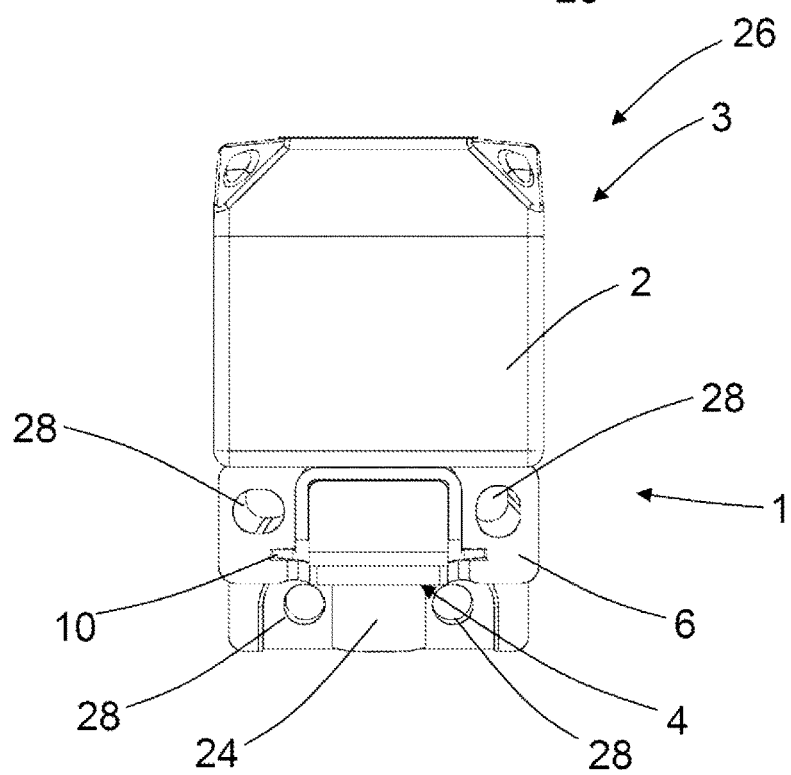
Figure 3:
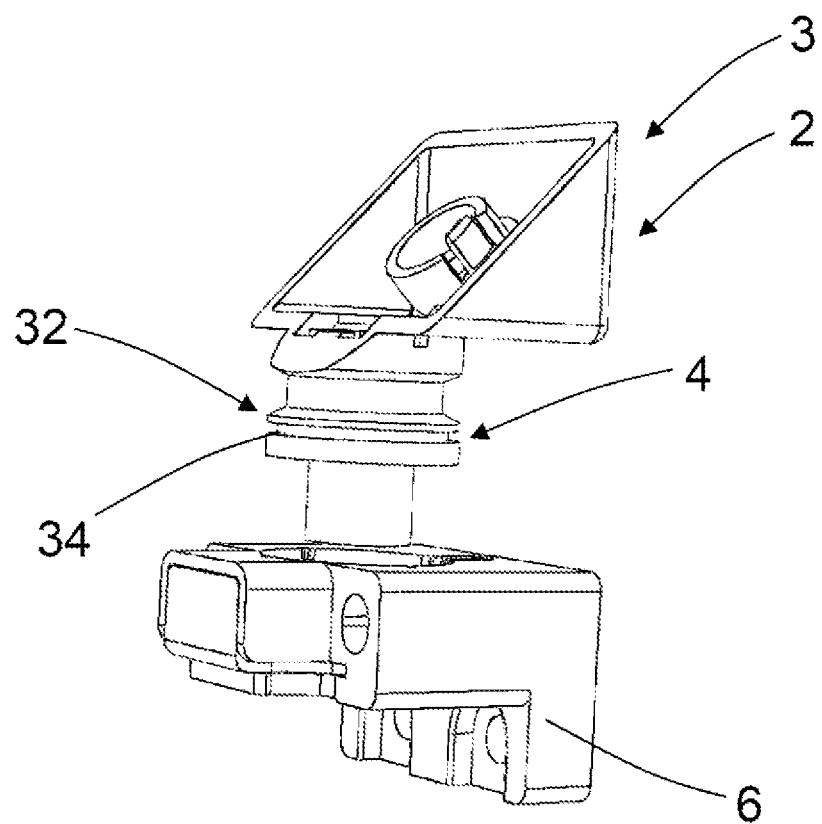
Figure 4:
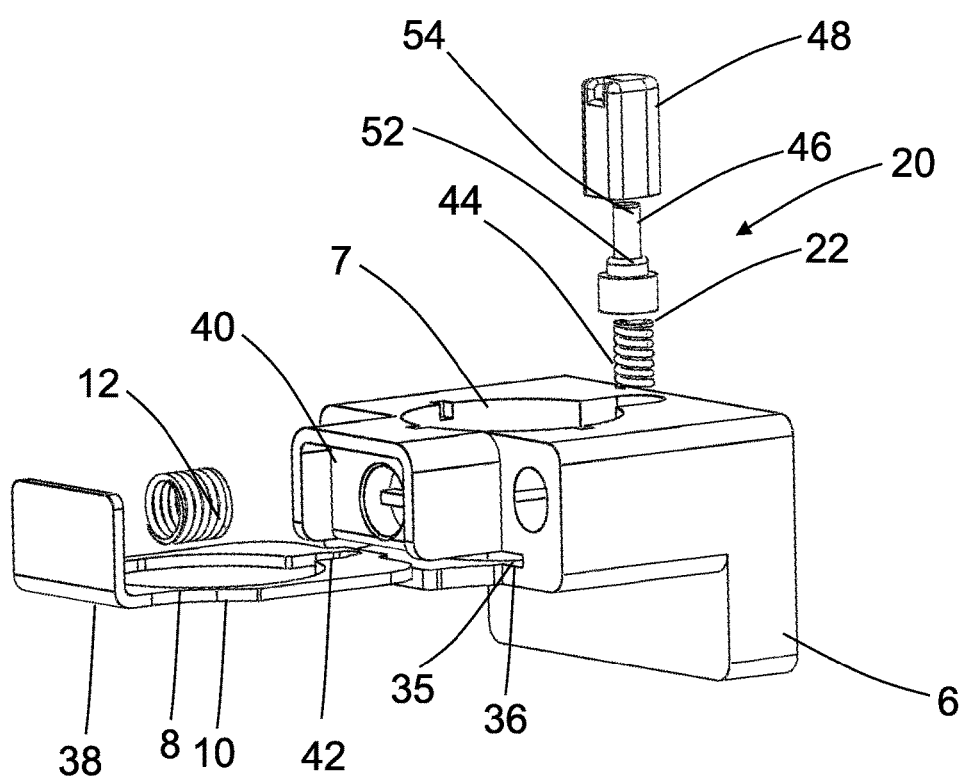
Figure 5:
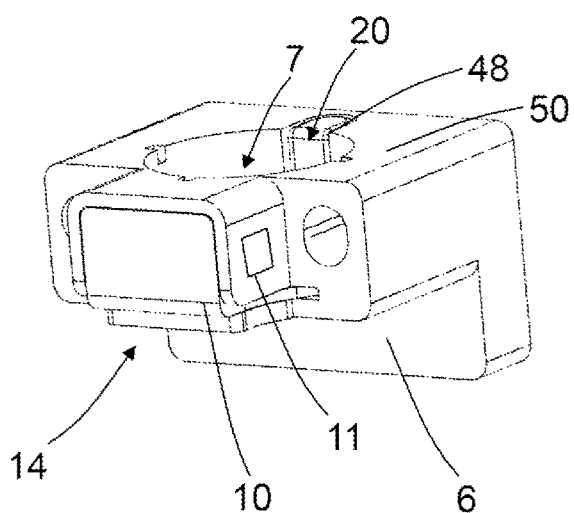
Figure 6:
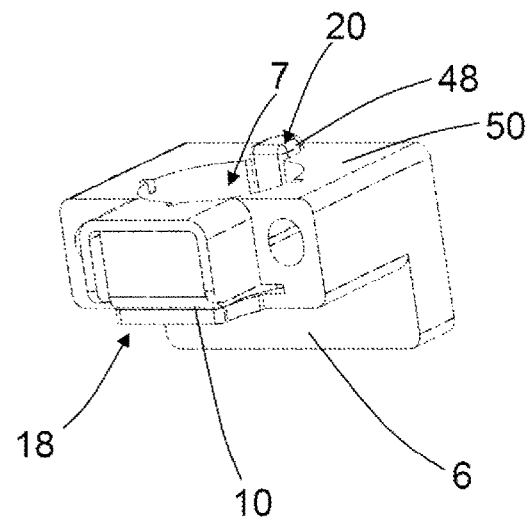
Figure 7:
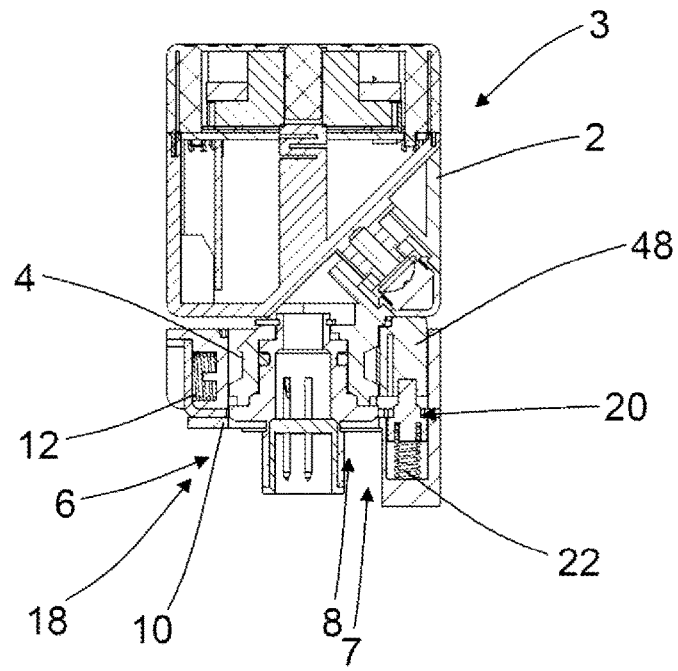
Figure 8:
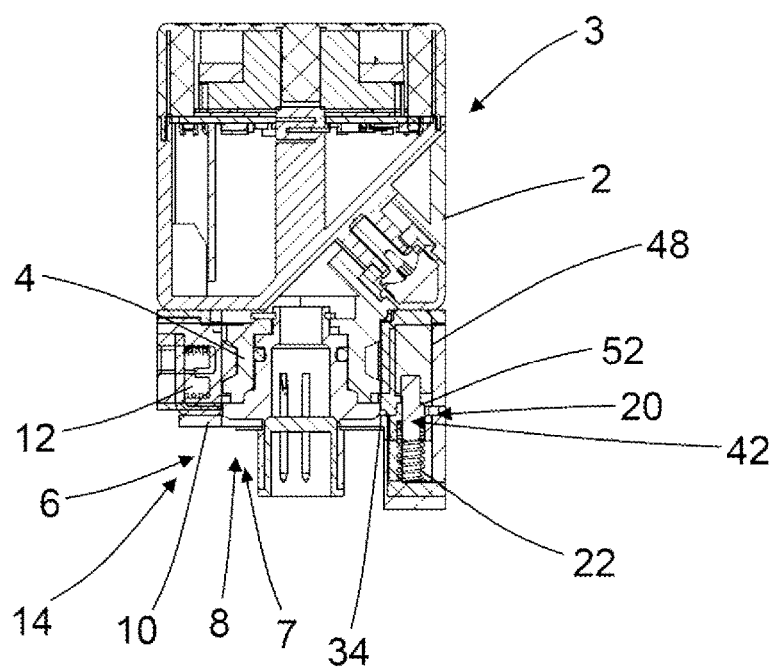
Figure 9:
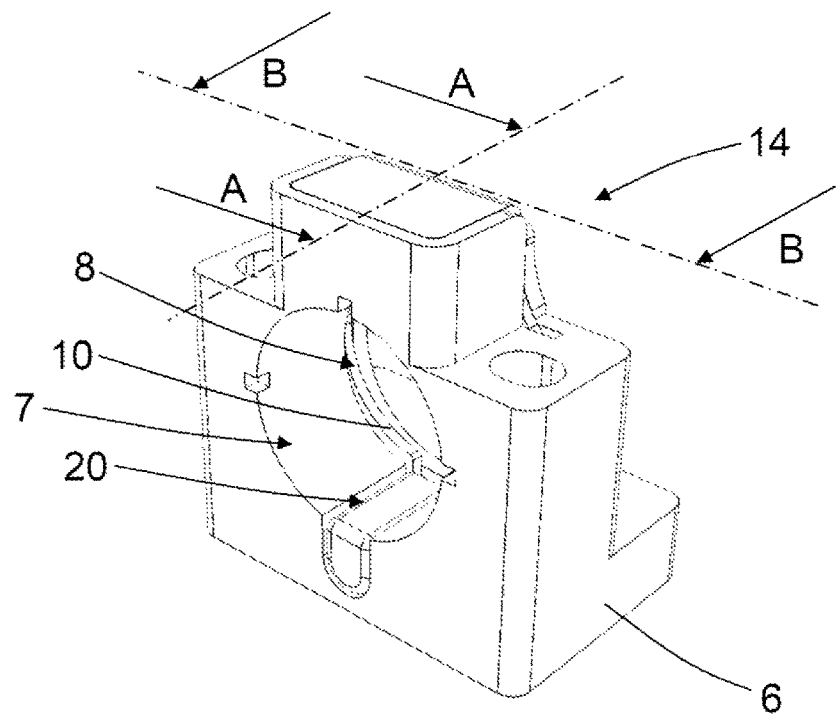
Figure 10:
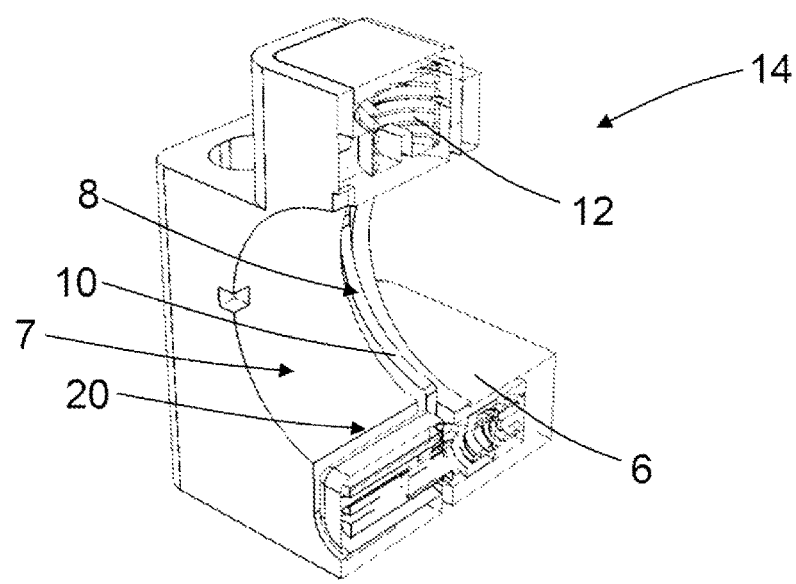
Figure 11:
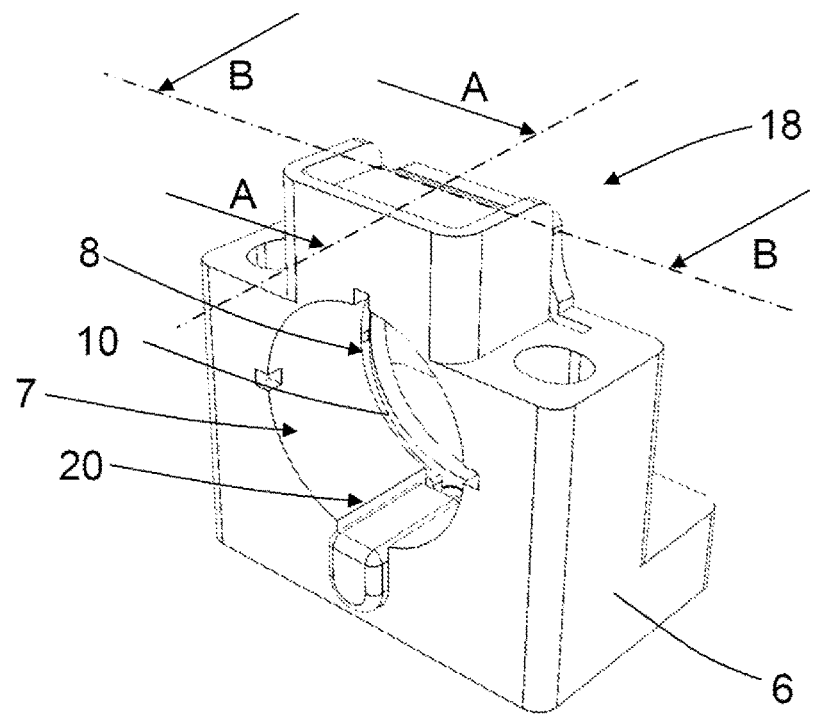
Figure 12:
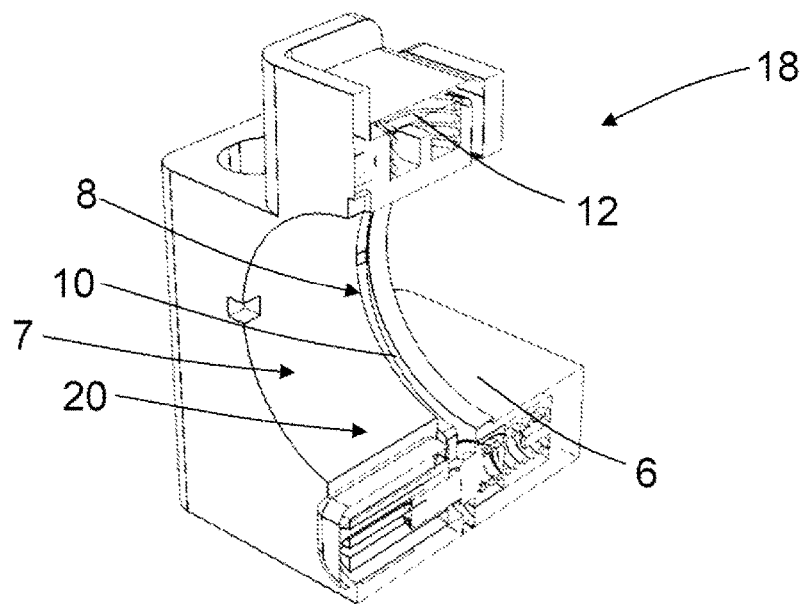
Figure 13:
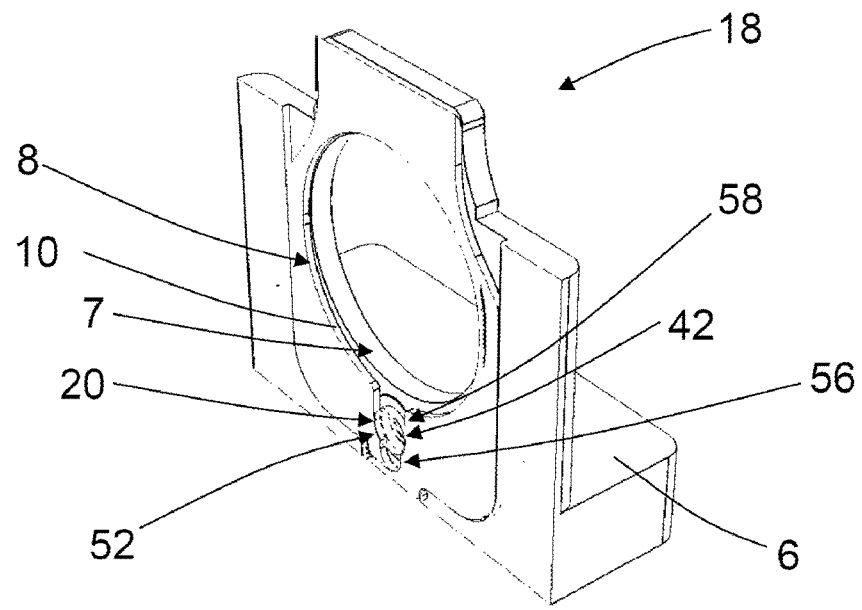
Figure 14:
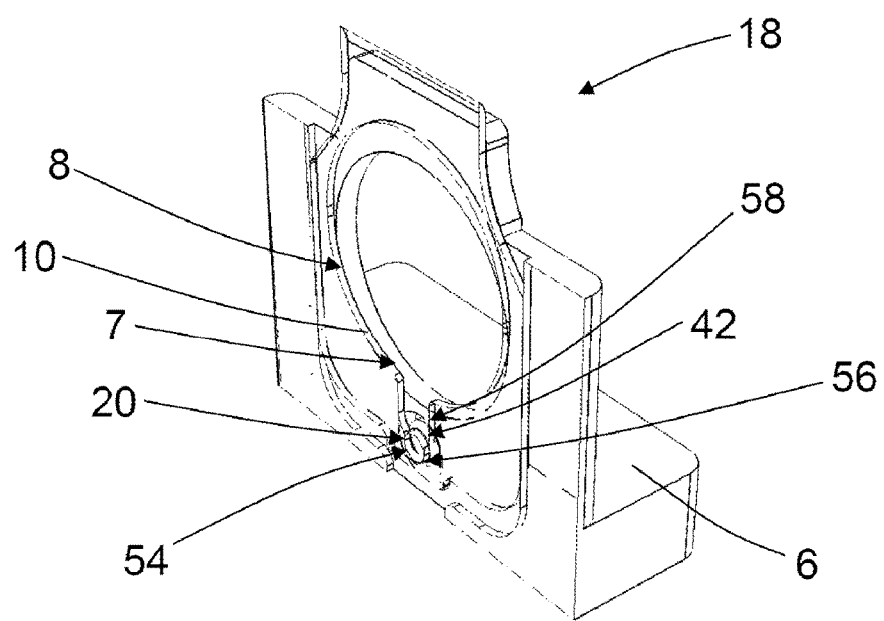

The invention will also be explained in the following with respect to further advantages and features with reference to the enclosed drawing and to embodiments. The Figures of the drawing show in:

FIGS. 1 and 2 a fastening apparatus in accordance with the invention;

FIG. 3 a fastening base in a perspective view;

FIG. 4 a fastening base in an exploded representation;

FIGS. 5 and 6 a fastening base with the parts of FIG. 4 in an assembled state;

FIGS. 7 and 8 a sensor housing having a fastening flange and having a fastening base in a sectional representation;

FIG. 9 a fastening base with a fixing slider and with the locking slider;

FIG. 10 a fastening base with a fixing slider and with a locking slider in a sectional representation;

FIG. 11 a fastening base with a fixing slider and with a locking slider;

FIG. 12 a fastening base with a fixing slider and with a locking slider in a sectional representation;

FIGS. 13 and 14 a sectional representation of a fastening base; and

Figure 15:
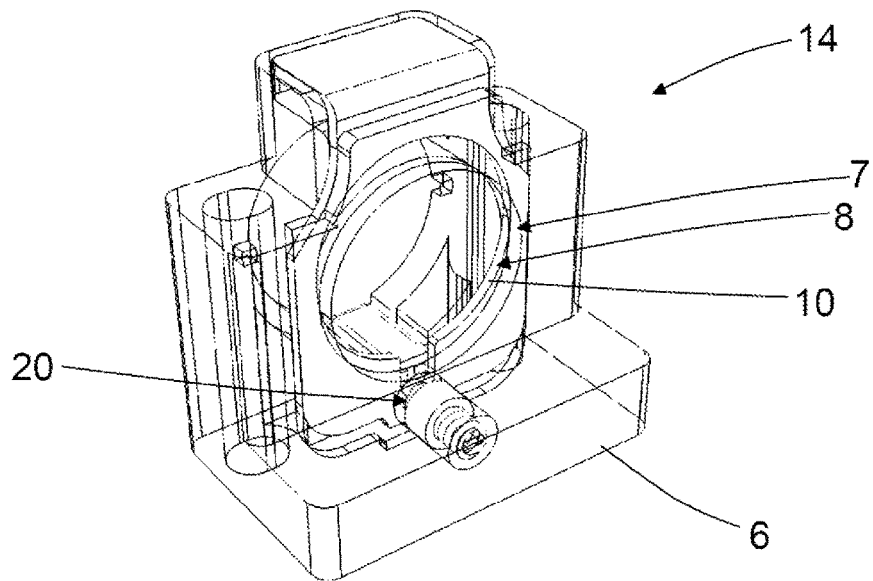
Figure 16:
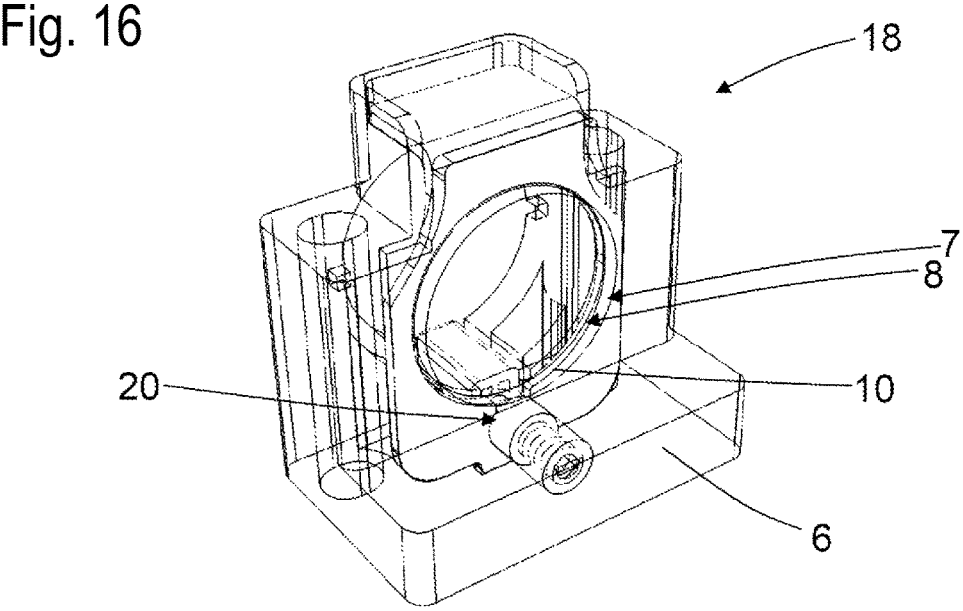

FIGS. 15 and 16 a perspective representation of a fastening base with a fixing slider and with a locking slider.

In the following Figures, identical parts are provided with identical reference numerals.

FIG. 1 shows a fastening apparatus 1 for an electronic device 3 in this case a sensor housing 2 having a fastening flange 4 and having a fastening base 6. The fastening flange 4 can be positioned in a passage opening 8 in the fastening base 6 and the fastening flange 4 can be locked in the fastening base 6. A fixing slider 10 is displaceably arranged at the fastening base 6 to lock and/or to release the fastening flange 4 in the fastening base 6.

FIG. 1 furthermore shows a method for fastening an electronic device 3 or a sensor housing 2 having a fastening flange 4 in a fastening base 6, wherein the fastening flange 4 is positioned in the fastening base 6. The fastening flange 4 is locked in the fastening base 6. A fixing slider 10 is provided, which is displaced at the fastening base 6, to lock and/or to release the fastening flange 4 in the fastening base 6.

The sensor 26 in the sensor housing 2 can, for example, be an inductive proximity sensor to detect metallic objects. The sensor 26 can, however, also be a capacitive or an optical sensor. The sensor housing 2 in accordance with FIG. 1 is formed in the shape of a cube, wherein the fastening flange 4 is arranged at one side of the sensor housing 2. The fastening flange 4 has a cylinder-like or a cylindrical shape. Due to the cylindrical shape of the fastening flange 4, it can be rotatably supported in the fastening base 6.

An electrical interface 24, for example a contact plug or a contact socket, is arranged at the end of the fastening flange 4. The sensor 26 is supplied with energy and the electronic signals are transmitted from the sensor 26 via the electrical interface.

The sensor housing 2 is fastened with the aid of the fastening base 6. The sensor housing 2 is exchangeably mounted at the fastening base 6 in this respect. It is desired or necessary in this respect that the sensor 26 is again fixed to the exact same position as the original sensor 26 when substituted.

The fastening base 6 has fastening openings 28 to fasten the fastening base 6 to a support, for example, to an assembly body not shown. Conventional screws are, for example, used to fasten the fastening base 6 to a support or to the assembly body respectively.

FIG. 2 is a view from above in accordance with the representation of FIG. 1.

FIG. 3 shows the fastening base 6 schematically in a perspective view, wherein the sensor housing 2 is only partly represented. In accordance with FIG. 3, the fastening flange 4 is not yet arranged in the fastening base 6. The fastening flange 4 has a radially projecting peripheral projection 32 between the free end and the sensor housing 2, said projection itself having a peripheral radial fastening groove 34. This fastening groove 34 serves for locking the fastening flange 4 in the fastening base 6.

The fastening flange 4 can also have other shapes, for example, a square shape or a rectangular shape. The sensor can thereby be restricted to certain directions of assembly such that the sensor is not rotatably supported in the fastening base 6.

FIG. 4 shows an exemplary fastening base 6 in an exploded representation. The fastening base 6 has a passage opening 7 for the fastening flange 4. The fastening base 6 furthermore has a guide 35, in particular a guide chute 36, for the fixing slider 10. The fixing slider 10 is displaceably arranged in the guide 35 or in the guide chute 36. The fixing slider 10 furthermore has an actuation means 38 to actuate the fixing slider 10 either by a finger or using a tool.

Furthermore, a chamber 40 is optionally provided with a first spring 12. The first spring 12 is arranged between the fastening base 6 and the fixing slider 10, wherein the first spring 12 is pressed together when the actuation means 38 of the fixing slider 10 is actuated. The fixing slider 10 is thereby not held actuated in a locking position.

A locking slider 20 is arranged at a margin of the passage opening 7 of the fastening base 6 in a cut-out 44 of the fastening base 6. The locking slider 20 is, for example, formed by a slider element 46, a second spring 22 and an actuation element 48. The slider element 46 is, for example, made cylindrical having a cylinder-like section with two different diameters 52 and 54. The locking slider 20 is fixed by the second spring 22. In this position, the fixing slider 10 can be moved from a locking position into an assembly position.

A passage opening 8 and a cut-out 42 are also arranged at the fixing slider 10. The passage opening 8 and the cut-out 42 of the fixing slider 10 correspond to the cross-section of the passage opening 7 and of the cut-out 44 of the fastening base 6.

The fastening base 6, the slider element 46 and the actuation element 48 are, for example, manufactured of plastic, in particular in an injection molding process. However, it is also possible to manufacture these elements of steel, in particular of stainless steel. The fixing slider 10, the first spring 12 and the second spring 22 are preferably manufactured of steel or of stainless steel.

FIG. 5 shows the fastening base 6 with the parts of FIG. 4 in an assembled state. The fixing slider 10 is represented in a non-actuated state, namely in a locking position 14. The passage opening of the fixing slider 10 and the passage opening 7 of the fastening base 6 are mutually displaced in this case such that the fixing slider 10 projects into the fastening groove of the fastening flange not shown. The actuation element 48 of the locking slider 20 is flush with a side surface 50 of the fastening base 6 in this case.

In accordance with FIG. 5, blocking means 11 are optionally provided, whereby the fixing slider 10 can be blocked in the locking position 14. It is ensured by the actuated blocking means 11 that the electronic device i.e. the sensor housing is not released by an accidental actuation of the fixing slider 10 or of the actuation means such that the actuation means would move into the assembly position such that the electronic device i.e. the sensor housing would no longer be fixed or locked. With an actuated blocking means 11, the fixing slider 10 i.e. the actuation means cannot be actuated. The fixing slider 10 i.e. the actuation means can only be actuated after a release of the blocking means 11.

FIG. 6 shows the fastening base 6 of FIG. 5, wherein the fixing slider 10 is shown in an actuated state such that the fixing slider 10 is arranged in an assembly position 18 and such that the passage opening of the fixing slider 10 and the passage opening 7 of the fastening base 6 lie flush over one another, such that the fastening flange 4 of the sensor housing can be pushed into the passage opening of the fixing slider 10 and of the fastening base 6. In this state the actuation element 48 of the locking slider 20 projects from a side surface 50 of the fastening base 6.

FIG. 7 shows the sensor housing 2 having the fastening flange 4 and having the fastening base 6 in a sectional representation. The fixing slider 10 is shown in an actuated state in this respect such that the passage opening 7 of the fastening base 6 and the passage opening 8 of the fixing slider 10 are congruent. This position of the fixing slider 10 is fixed by the position of the locking slider 20. The locking slider 20 is held in this position by the second spring 22. The locking slider 20 respectively the actuation element 48 of the locking slider 20 projects over and beyond the side surface of the fastening base 6 in this respect. The fixing slider 19 is preloaded by the first spring 12 in this position. In this assembly position 18 of the fixing slider 10, the sensor housing 2 having the fastening flange 4 can be pushed into the passage opening 7 of the fastening flange 6. In this case a side wall of the sensor housing 2 reaches the locking slider 20 i.e. the actuation element 48 of the locking slider 20, whereby the locking slider is pressed in the direction of the second spring 22. This state is represented in FIG. 8.

In accordance with FIG. 8, the locking slider 20 is moved in the direction of the second spring 22. The locking slider 20 is thereby displaced such that the diameter 52 of the locking slider 20 is reduced at the position of the cut-out 42 of the fixing slider 10, whereby the cut-out 42 of the fixing slider 10 is no longer fixed by the locking slider 20 and the fixing slider 10 is displaced by the first spring 12 in the direction of the first spring 12, such that the fixing slider 10 engages into the fastening groove 34 of the fastening flange 4, whereby the fastening flange 4 is axially fixed in the fastening base 6. Moreover, depending on the form of the fastening groove 34 and of the fixing slider 10, a radial fixing can also be achieved.

The fixing slider 10 is pressed against the first spring 12 again for releasing the sensor housing 2. The passage openings 7 of the fastening base 7 and of the fixing slider 10 are thereby congruent again, whereby the fastening flange 4 can be axially removed from the fastening base 6. On the removal of the sensor housing 2, the locking slider 20 is moved in the direction of the sensor housing 2 again by the second spring 22, whereby the fixing slider 10 is fixed in the assembly position 18 again by the cut-out. FIG. 9 perspectively shows the fastening base 6 with the fixing slider 10 and with the locking slider 20, however without a sensor housing, such that the passage opening 7 of the fastening base 6 is visible. FIG. 9 shows the fixing slider 10 in a locking position 14 in which it is held by the first spring. In this state the passage opening 8 of the fixing slider 10 is not flush with the passage opening 7 of the fastening base 10. In this position, the sensor housing is either fixed in the fastening base 6 or cannot be pushed into the passage opening 7.

FIG. 10 shows a sectional representation in the A-A direction in accordance with FIG. 9.

FIG. 11 perspectively shows the fastening base 6 with the fixing slider 10 and with the locking slider 20, however without a sensor housing, such that the passage opening 7 of the fastening base 6 is visible. FIG. 11 shows the fixing slider 10 in an assembly position 18 in which the fixing slider 10 is, for example, held against the spring force of the first spring by a finger. The passage opening 8 of the fixing slider 10 is flush with the passage opening 7 of the fastening base 6 in this respect. In this position, the sensor housing 2 is either not fixed in the fastening base 6 or can be pushed into the passage opening 7 for the assembly.

FIG. 12 shows a sectional representation in the A-A direction in accordance with FIG. 11.

FIG. 13 shows a sectional representation in the B-B direction in accordance with FIG. 11. The passage opening 7 of the fastening base 6 and the passage opening 8 of the fixing slider 8 are flush in this state. The larger diameter 52 of the locking slider 20 fixes the fixing slider 10 via its cut-out 42. The cut-out 42 of the fixing slider 10 has a first spacing 56 and a second further spacing 58 for this purpose. The larger diameter 52 of the locking slider 20 engages into the second further spacing 58 of the cut-out 42 of the fixing slider 10, such that the fixing slider can no longer be displaced in the direction of the first spring (not shown). If a sensor housing having a fastening flange is, however, pushed into the fastening base 6, the locking slider 20 is displaced at the position of the fixing slider 10 from the larger diameter 52 to a smaller diameter 54. This is represented in FIG. 14.

FIG. 14 shows a sectional representation in the B-B direction in accordance with FIG. 9. FIG. 14 shows the smaller diameter 54 of the locking slider 20. Since the larger diameter 52 of the locking slider 20 no longer fixes the fixing slider 10, the fixing slider 10 is pressed by the first spring in the direction of the first spring 12 such that the cut-out 42 having the first smaller spacing 56 engages into the smaller diameter 54 of the locking slider 20 and fixes the locking slider in a locking position 14 together with the first spring 12. In this respect, the passage opening 8 of the fixing slider 10 and the passage opening 7 of the fastening base 6 are no longer flush with respect to one another.

FIG. 15 perspectively shows the fastening base 6 with the fixing slider 10 and with the locking slider 20, however without the sensor housing 2, such that the passage opening 7 of the fastening base 6 is visible in a transparent representation. FIG. 15 shows the fixing slider 10 in a locking position 14 in which the fixing slider is held by the first spring. The passage opening 8 of the fixing slider 10 is not flush with the passage opening 7 of the fastening base 6 in this state. In this position, the sensor housing is either fixed in the fastening base 6 or cannot be pushed into the passage opening 7.

FIG. 16 perspectively shows the fastening base 6 with the fixing slider 10 and with the locking slider 20, however without the sensor housing 2, such that the passage opening 7 of the fastening base 6 is visible in a transparent representation. FIG. 16 shows the fixing slider 10 in an assembly or installed position 18 in which the fixing slider is, for example, held against the spring force of the first spring by a finger. The passage opening 8 of the fixing slider 10 is flush with the passage opening 7 of the fastening base 6 in this state. In this position, the sensor housing is either not fixed in the fastening base 6 or can be pushed into the passage opening 7 for the assembly.

REFERENCE NUMERALS 1 fastening apparatus
2 sensor housing
3 electronic device
4 fastening flange
6 fastening base
7 passage opening of the fastening base
8 passage opening of the fixing slider
10 fixing slider
11 blocking means
12 first spring
14 locking position
16 actuation surface
18 assembly position
20 locking slider
22 second spring
24 electrical interface
26 sensor
28 fastening openings
32 projection
34 fastening groove
35 guide
36 guide chute
38 actuation means
40 chamber
42 cut-out of the fixing slider
44 cut-out of the fastening base
46 slider element
48 actuation element
50 side surface
52 larger diameter of the locking slider
54 smaller diameter of the locking slider
56 first smaller spacing of the cut-out
58 second larger spacing of the cut-out

The invention claimed is:

1. A fastening apparatus for an electronic device (3) having a fastening flange (4) and having a fastening base (6), wherein the fastening flange (4) is configured to be positioned in a passage opening (8) in the fastening base (6) and wherein the fastening flange (4) is configured to be locked in the fastening base (6); wherein a fixing slider (10) is displaceably arranged at the fastening base (6) to lock and/or to release the fastening flange (4) in the fastening base (6); wherein the fixing slider (10) has a first spring (12) and the fixing slider (10) is positioned in a locking position (14) by the first spring (12); and wherein a locking slider (20) is configured to be displaced by the electronic device (3) upon an introduction of the fastening flange (4) into the fastening base (6), whereby a locking of the fixing slider (10) by the locking slider (20) is released, and wherein the fixing slider (10) is moved from an assembly position (18) into the locking position (14) by the first spring (12); and the fixing slider (10) is held in the assembly position (18) by the locking slider (20).

2. A fastening apparatus in accordance with claim 1, wherein the fixing slider (10) has an actuation surface (16), the fixing slider (10) is brought into the assembly position (18) for the fastening flange (4) by displacement by the actuation surface (16), and the fastening flange (4) is configured to be introduced into the passage opening (8) of the fastening base (6).

3. A fastening apparatus in accordance with claim 1, wherein the fixing slider (10) is held in the assembly position (18) by the locking slider (20).

4. A fastening apparatus in accordance with claim 3, wherein the locking slider (20) is positioned by a second spring (22).

5. A fastening apparatus in accordance with claim 1, wherein a blocking structure (11) is provided that is configured to block the fixing slider (10) in the locking position (14).

6. A method for fastening an electronic device (3) having a fastening flange (4) in a fastening base (6), comprising steps of:

positioning the fastening flange (4) in the fastening base (6); and locking the fastening flange (4) in the fastening base (6); wherein a fixing slider (10) is provided which is displaced at the fastening base (6) to lock and/or to release the fastening flange (4) in the fastening base (6);

the fixing slider (10) has a first spring (12) that fixes the fixing slider (10) in a locking position (14);

the fixing slider (10) is initially held in an assembly position (18) by a locking slider (20); and the locking slider (20) is displaced by the electronic device (3) upon the introduction of the fastening flange (4) into the fastening base (6), whereby the fixing slider (10) is released from the assembly position by the locking slider (20), and wherein the fixing slider (10) is moved from the assembly position (18) into the locking position (14) by the first spring (12).

7. A method for fastening an electronic device (3) in accordance with claim 6, wherein the fixing slider (10) has an actuation surface (16), the method further comprising:

bringing the fixing slider (10) into the assembly position for the fastening flange (4) by displacing by the actuation surface (16); and introducing the fastening flange (4) into a passage opening (8) of the fastening base (6).

8. A method for fastening an electronic device (3) in accordance with claim 6, wherein the fixing slider (10) is held in the assembly position (18) by a locking slider (20).

9. A method for fastening a sensor housing (2) in accordance with claim 8, further comprising:

fixing the locking slider (20) by a second spring (22).

10. A method for fastening an electronic device (3) in accordance with claim 6, further comprising blocking the fixing slider (10) in the locking position (14) by a blocking structure (11).

* * * * *